Dec. 30, 1969 A. H. FREY, JR 3,487,362

TRANSMISSION ERROR DETECTION AND CORRECTION SYSTEM

Filed April 10, 1967 3 Sheets-Sheet 1

| DATA | | | | | | | | CHECK WORD | | | | | | | |
|---|---|---|---|---|---|---|---|---|---|---|---|---|---|---|---|
| 1 | 201 | 401 | 601 | 801 | 1001 | 1201 | 1401 | 1 | 201 | 401 | 601 | 801 | 1001 | 1201 | 1401 |
| 2 | 202 | 402 | 602 | 802 | 1002 | 1202 | 1402 | 2 | 202 | 402 | 602 | 802 | 1002 | 1202 | 1402 |
| 3 | 203 | 403 | 603 | 803 | 1003 | 1203 | 1403 | 3 | 203 | 403 | 603 | 803 | 1003 | 1203 | 1403 |
| 4 | 204 | 404 | 604 | 804 | 1004 | 1204 | 1404 | 4 | 204 | 404 | 604 | 804 | 1004 | 1204 | 1404 |
| 197 | 397 | 597 | 797 | 997 | 1197 | 1397 | 1597 | 197 | 397 | 597 | 797 | 997 | 1197 | 1397 | 1597 |
| 198 | 398 | 598 | 798 | 998 | 1198 | 1398 | 1598 | 198 | 398 | 598 | 798 | 998 | 1198 | 1398 | 1598 |
| 199 | 399 | 599 | 799 | 999 | 1199 | 1399 | 1599 | 199 | 399 | 599 | 799 | 999 | 1199 | 1399 | 1599 |
| 200 | 400 | 600 | 800 | 1000 | 1200 | 1400 | 1600 | 200 | 400 | 600 | 800 | 1000 | 1200 | 1400 | 1600 |

INVENTOR
ALEXANDER H. FREY, JR.

BY Edward S. Gershuny
AGENT

Dec. 30, 1969 A. H. FREY, JR 3,487,362

TRANSMISSION ERROR DETECTION AND CORRECTION SYSTEM

Filed April 10, 1967 3 Sheets-Sheet 2

Dec. 30, 1969 A. H. FREY, JR 3,487,362

TRANSMISSION ERROR DETECTION AND CORRECTION SYSTEM

Filed April 10, 1967 3 Sheets-Sheet 3

3,487,362

TRANSMISSION ERROR DETECTION AND CORRECTION SYSTEM

Alexander H. Frey, Jr., Gaithersburg, Md., assignor to International Business Machines Corporation, Armonk, N.Y., a corporation of New York Filed Apr. 10, 1967, Ser. No. 629,667
Int. Cl. G06f *11/00;* G08b *29/00;* H04b *1/00*
U.S. Cl. 340—146.1 10 Claims

ABSTRACT OF THE DISCLOSURE

A transmission error detection and correction system. A message comprising data and redundancy is received by a decoder which divides a polynomial representing the message by a coding polynomial to produce a syndrome. The syndrome is examined by adaptive decision circuitry to determine whether or not a single large burst of errors was present in the received meessage. If so, the errors are corrected by correction circuitry using burst error correction techniques. If not, errors are corrected by the correction circuitry using random error correction techniques.

This invention relates to detection and correction of transmission errors. More particularly, it relates to a system which is capable of detecting and correcting both burst errors and random errors. The invention herein described was made in the course of or under a contract with the United States Air Force.

In digital computers and in data transmission systems, binary code sequences are frequently employed. These binary code sequences take the form of trains of positive and negative electrical pulses representing zero and one data bits. In data transmission systems which are subject to noise, many different kinds of error correcting codes have been developed to provide a means for detecting and correcting these errors. The kinds of errors which the various codes are capable of detecting fall generally into either one of two classifications; random errors or burst errors. Much of the theory behind the use of random error correcting codes has been based upon the assumption that each bit in a message is affected independently by noise, and that therefore the probability of a given error pattern depends only on the number of errors. Thus, for example, a random error correcting code will correct any pattern of $b$ or fewer errors in a block of $n$ bits. Although this assumption may lead to an appropriate model for many transmission system, there are many others in which errors occur predominantly in bursts. For example, telephone line disturbances, such as lightning, generally occur intermittently and last longer than the time for one bit. As a further example, magnetic tape defects are generally larger than the space required for a bit and such defects will affect several bits within a given area of tape.

Various burst error correcting codes are presently known and used. Also, many random error correcting codes are presently in use. However, in the prior art, random error correcting codes are incapable of efficient burst error correction, and burst error correcting codes are incapable of random error correction. This is because the criteria which determine whether or not a code is suitable for burst error correction and the criteria which determine whether or not a code is suitable for random error correction are mutually exclusive; that is, there is no prior art technique which is capable of adapting between random error correction and burst error correction. The disadvantages flowing from this fact have plagued designers for many years; random error correction techniques are relatively inefficient in terms of the number of errors that can be corrected as compared to the amount of redundancy that must be added to a message; burst error correction techniques can correct a relatively large cluster of errors but cannot correct even a very few errors that are widely scattered throughout a message.

It is therefore a primary object of this invention to realize the advantages of both burst error correction and random correction while avoiding the disadvantages that have been described above.

It is a more particular object of this invention to correct dense clusters (bursts) of errors within a message and also to correct errors that are widely scattered throughout a message.

The above and related objects are accomplished in accordance with one aspect of the invention by providing a system which is capable of detecting and correcting both burst errors and random errors. A transmitted message which comprises data bits and redundancy bits is received by decoding circuitry which will operate upon the received message to generate a syndrome or check word which is then used for error detection and correction. Adaptive decision circuitry will examine the check word and determine whether or not a correctable burst of errors is indicated and whether or not a large number of errors is indicated. If analysis of the check word indicates that a correctable burst containing a large number of errors is present, then the system will utilize burst error correction techniques to correct the errors. If the check word indicates that the errors do not form a correctable burst or that the errors are relatively small in number, then the system will use random error correction techniques to correct the errors.

The primary advantage of this invention is that it adapts itself to correct bursts containing many errors or to correct errors that are widely scattered throughout the message. A message containing random errors and one or more short bursts will also be corrected. Thus, the invention provides a single system which contains all of the advantages of prior art burst error correction systems and prior art random error correction systems while avoiding the major disadvantages inherent in each.

The foregoing and other objects, features and advantages of the invention will be apparent from the following more particular description of a preferred embodiment of the invention as illustrated in the accompanying drawings.

Figures 1, 2:
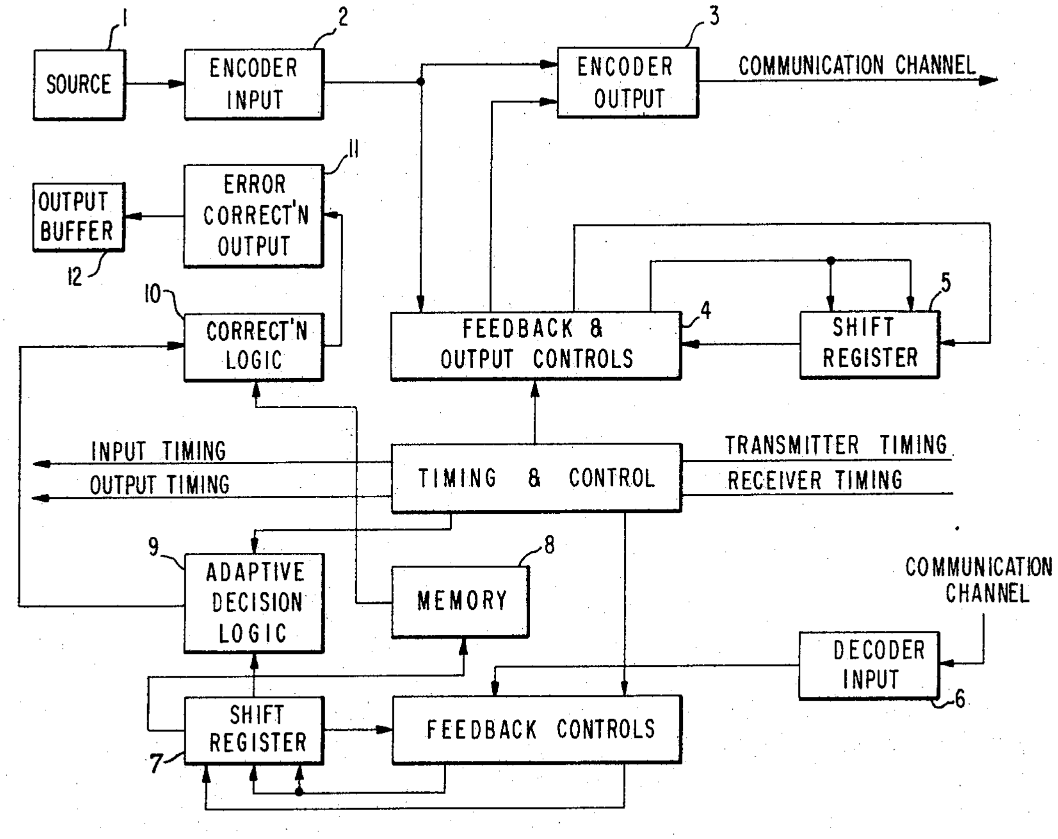
FIG. 1 is a general block diagram of a communication system embodying this invention.
FIG. 2 illustrates the matrix arrangement of data bits and syndrome bits that is used with this invention.

This invention incorporates within it the invention described in my copending application Ser. No. 602,101 filed Dec. 15, 1966, for Burst Error Correction System and assigned to International Business Machines Corporation.

That invention is capable of using any arbitrary polynomial of degree $r$ greater than or equal to $b+\log_2(n+1)$, where $b$ is the maximum length of a burst to be corrected and $n$ is the length of a block of a transmitted message. The message is encoded by first multiplying the polynomial D(X) representing the incoming bits of information by $X^r$ and then dividing by the coding polynomial P(X) to obtain a message M(X)

$$M(X)=X^rD(X) \oplus R(X)=P(X)Q(X)$$

where Q(X) is the quotient obtained as a result of the division process.

At the receiver, the received message M′ is multiplied by $X^a$ where $a=\alpha-(n-r)$ where $\alpha$ is the period of the coding polynomial P(X), and divided by the coding polynomial P(X). If the remainder of this division is equal to zero, then no errors have occurred in the transmission of the message. If the remainder is not equal to zero, then it will be used in the correction process.

If none of the errors have occurred outside the first $b$ bits that were transmitted, then the lowest order $r-b$ bit positions of the remainder will all be zero and the highest order $b$ bit positions of the remainder will contain the burst error pattern. If errors have occurred outside the first $b$ bits transmitted, but none have occurred outside the first $r$ bits transmitted, then some 1's will appear in the first $r-b$ bit positions of the remainder. If errors have occurred outside the first $r$ bits transmitted, then there is some fixed probability E (dependent upon the coding polynomial and on the number of errors outside the first $r$ bits transmitted) that each single bit position of the remainder from position 1 through position $r-b$ will be zero. Assuming that the probability of error, E, for each of the positions is independent, then the probability that all of the bit positions from one through $r-b$ will be zero simultaneously is approximately equal to $E^{r-b}$. Thus, if the condition of all zeros in the $r-b$ lowest order positions of the remainder is used to indicate a burst of errors in the first $b$ bits transmitted, with the pattern of 1's in the remainder representing the error pattern, then there is a probability of error $E^{r-f}$ which can be made arbitrarily small by making $r-b$ large.

If the condition for existence of a correctable burst is not met, then the remainder bits can be shifted in a shift register and the same condition checked to determine if a correctable burst of errors has occurred in bits 2 through $b+1$ of the transmitted block. Each succeeding shift of the register will shift the span of bits over which the burst is detected by one bit position. The shifting operation can be done $n-b$ times. The probability of falsely detecting, at some shift through the block, the condition which indicates a burst of length less than or equal to $b$ bits is then approximately $(n-b)\ E^{r-b}$. For large values of $r-b$, this probability will be very small.

For a more detailed description of the Burst Error Correction System, reference is made to my aforementioned copending application Ser. No. 602,101 which is to be considered as being incorporated herein.

In accordance with one aspect of this invention, a coding polynomial is selected that has random error correcting capabilities. After a message has been received and a check word has been generated by the decoder, the check word will be examined in a manner similar to that described in application Ser. No. 602,101 to determine whether or not a correctable burst of errors has occurred. If a correctable burst has occurred, it is corrected using burst error correction techniques. If a correctable burst has not occurred, the check word can then be applied to random error correction.

SYSTEM CONFIGURATION

A block diagram showing the major components of a burst error correction and random error correction system incorporating the invention is shown in FIG. 1. The system shown can both encode a message for transmission and receive an encoded message. Data are received from a source 1 at the encoder input 2. The data are sent to the encoder output 3 to be transmitted via a communication channel and the data are also sent to the feedback and output controls 4. Remainder bits to be used for error detection and correction are calculated in the feedback shift register 5. During the encoding process, the feedback to the shift register 5 is controlled by the data sent to the feedback and output controls 4 from the encoder input 2. After the remainder bits have been calculated, they are sent to the encoder output 3 to be transmitted via the communication channel.

When the system is operating as a receiver, data bits and redundancy bits are received at the decoder input 6 form another encoder (not shown). The data and redundancy bits are used in the feedback shift register 7 to calculate the check word (syndrome) corresponding to the received data and redundancy. Each redundacy bit is discarded after its contribution to the check word has been made. Thus, there is no need to store any of the redundancy in the decoding process. The incoming data word will be stored in the memory 8 and the calculated check word will be temporarily stored in the shift register 7. After it has been calculated, the check word may then be placed in the memory 8 so that the shift register 7 may be used to calculate the check word for the next incoming message.

When calculation of the check word is completed and the check word has been stored, the pattern in the check word is examined by the adaptive decision logic 9. The adaptive decision logic determines whether or not a correctable burst has occurred. If it is determined that a correctable burst has occurred, the error correction logic 10 will be set to its bust correction mode to correct it. The appropriate correction is made as the data are passed through the error correction logic 10 to the output buffer 12. If it is determined that an error which is not a correctable burst has occurred, the error correction logic 10 will be set to its random error correction mode. The appropriate correction is made as the data are passed through the error correction logic 10.

As the data are passed out of the memory 8 through the correction logic to the output, they are replaced in the memory by new data from the decoder input 6. As in prior art systems, timing for data to the decoder input is received via the communication channel. The various ways in which timing control may be accomplished are well known to those skilled in the art and need not be discussed here.

SELECTION OF A CODING POLYNOMIAL

It will generally be desirable to select a polynomial of very high degree (the "degree" of a polynomial is defined as the highest power of "X" that appears in the polynomial) as the coding polynomial. A very high degree polynomial with random-error-correction properties that can reasonably be implemented is obtained by interleaving a large number of low-degree polynomials which have random-error-correcting properties. This may be done because of the following: if $P_1(X)$ is a polynomial of degree $r_1$ which has good random-error-correction capability in a block of $n_1$ bits, then $P(X)=P_1(X^s)$ is a polynomial of degree $r=sr_1$ which has good random-error-correction capability over a block of length $n=sn_1$.

For the purpose of this example, it is assumed that data will be entering the system in blocks that are 1600 bits in length. If we use a half-rate code (i.e., a code in which there are equal amounts of information and redundancy), then a 1600$^{th}$ degree polynomial will be needed for the coding polynomial. The eighth degree polynomial $$P_1(X)=X^8+X^7+X^6+X^4+X^2+X+1$$

is chosen as the building block for the large polynomial. When used in a half-rate code, the polynomial $P_1(X)$ provides a double-error-correcting capability. The needed 1600$^{th}$ degree coding polynomial is then obtained by setting $$P(X)=P_1(X^{200})=X^{1600}+X^{1400}+X^{1200}+X^{800}+X^{400}+X^{200}+1$$

ADAPTIVE DECISION CRITERIA

The use of an interleaved polynomial P(X) presents some special problems for the burst error technique that is used as part of this invention. If the correctable burst $b$ is chosen so that $(r-b)<s$ where $r$ is the number of redundancy bits (1600) and $s$ is the number of interleaved small polynomials (200), then errors in the guard space (i.e., the remainder of the block outside the burst) in certain of the interleaved polynomials can occur without causing 1's to appear in the last $r-b$ bits of the check word while the burst pattern is in the places corresponding to the first $b$ bits of the check word. This could result in false correction. Even if $(r-b) \geq s$, a small number of random errors or a short burst of errors might result in a false indication that a correctable burst has occurred; that is, it may result in the last $r-b$ bits of the check pattern being all zeros while the first $b$ bits do not display the actual error pattern. Thus, some additional criteria must be included in the decision process to determine whether burst error correction or random error correction is appropiate (i.e., the "adaptive decision" process).

The following is the set of criteria which is used for determining that a correctable burst has occurred:

(1) $r-b$ is greater than or equal to $s$ and the last $r-b$ bits of the check word all contain zeros;

(2) the number of received check words of interleaved subwords which correspond to error conditions other than single errors is greater than some specified threshold;

(3) the pevious two criteria are not satisfied for two or more disjoint bursts (i.e., no ambiguity is presented by the other criteria).

Condition 1, in this example, requires that $b$ be less than or equal to 1400 (1600–200).

So far as satisfying Condition 2 is concerned, the number of random errors which can be corrected in each subblock is critical to the choice of the threshold. If the number of random errors that can be corrected by using $P_1(X)$ is $e$, then the threshold should be chosen high enough so that it presents a good indication that a large number of errors have occurred (as in a burst of length greater than $es$). However it should not be so high that the threshold will not be exceeded when many of the subwords have more than $e$ errors.

As was noted above, the length $b$ of a correctable burst must be less than or equal to 1400. When $s$ (the number of interleaved polynomials) is reasonably large (e.g., 15 or more), then burst correction is reliable with $r-b=s$. Thus, in the present case $b=7s=1400$.

An approximate value for the threshold T that is needed to satisfy Condition 2 can be obtained from $T \simeq \sqrt{2s}$. Thus, for $s=200$, T may be chosen to be 20.

DECODING A MESSAGE

A decoder to be used with this invention is constructed as follows: let P(X) denote the coding polynomial, and let $r$ and $n$ denote the degree of P(X) and the block length of the received messages, respectively. Compute the coefficients $b_i$ such that $$\sum_{i=0}^{r-1} b_i X^{n-r+i} = 1$$

modulo P(X). Let $a_i$ denote the coefficients of $x^i$ in P(X). Construct an $r$-bit feedback shift register with the stages numbered from 1 through $r$ and shifting from low to high numbered stages. Place an Exclusive-OR circuit (modulo-two adder) between stages $i$ and $i+1$ whenever $a_i$ or $b_i$ is 1, where the $i^{th}$ stage provides one input to the Exclusive-OR circuit and feedback as defined below provides the other input. The output is shifted from stage $i$ to stage $i+1$.

In those cases where $a_i=1$ and $b_i=0$, feedback to the Exclusive-OR circuit between stages $i$ and $i+1$ come from the $r^{th}$ stage. In those cases where $a_i=0$ and $b_i=1$, feedback comes from the input message bit. In those cases where $a_i=1$ and $b_i=1$, feedback comes from the output of an Exclusive-OR circuit, one input of which is connected to the output of the $r^{th}$ stage and the other input of which is the input message bit. The register is shifted with feedback for each input message bit in an encoded block. After $n$ shifts, all of the input bits have been entered into the register, and the register contains the check word corresponding to the received message block.

For examples of decoders constructed in accordance with the above, reference is again made to application Ser. No. 602,101 (particularly FIGS. 3 and 5 and those parts of the specification that refer thereto).

MATRIX ARRANGEMENTS OF DATA AND CHECK WORD

Because the coding polynomial P(X) was constructed by interleaving many smaller polynomials $P_1(X)$, the decision as to whether burst error correction or random error correction is appropriate in a given case can be simplified in the following manner. As was described above, the data portion of an incoming message is stored in the memory 8 as is the check word that was generated by the decoder. Conceptually, it is best to regard the data and the check word that are stored in the memory as occupying a matrix having $s$ rows and $n/s$ columns where $s$ is equal to the number of interleaved polynomials $P_1(X)$ that make up the large coding polynomial P(X) (200 in this example) and $n$ is the total number of bits in a coded message (3200 in this example). The matrix is filled on a column-by-column basis; that is, the first $s$ bits of data in the received message sequentially fill the first column of the matrix, the next $s$ bits of data in the received message sequentially fill the second column of the matrix, etc., until all of the data from the received message have been put in the matrix. Then the first $s$ bits of the calculated check word fill the next available column of the matrix and so on until the entire check word has also been placed in the matrix.

In the present example, as shown in FIG. 2, the first 200 bits of data in the received message will fill the first column of the matrix and the last 200 bits of data in the received message (bits 1401 through 1600) will fill the eighth column of the matrix. The first 200 bits of the check word will fill the ninth column of the matrix and the last 200 bits of the check word will fill the sixteenth column of the matrix. Thus, each row of the matrix will contain eight bits of data and eight bits of the check word. Because an interleaved coding polynomial was used, the eight bits of the check word appearing in any row of the matrix are equivalent to a complete check word for the eight bits of data ("subblock" of data) that are also in that row. Therefore, the eight bits of the check word that appear in any row of the matrix can be used to locate and correct errors in the data subblock that also appears in that row of the matrix. This property of the matrix shown in FIG. 2 is used to simplify the circuitry that is needed in order to make the decision as to whether burst error correction or random error correction is appropriate (the "adaptive decision"). Instead of examining the entire 1600-bit check word in a 1600-stage feedback shift register, the eight bits of the check word appearing in each row of the matrix can be examined in an eight-stage register in order to make the adaptive decision.

ADAPTIVE DECISION CIRCUITRY

Figure 3:
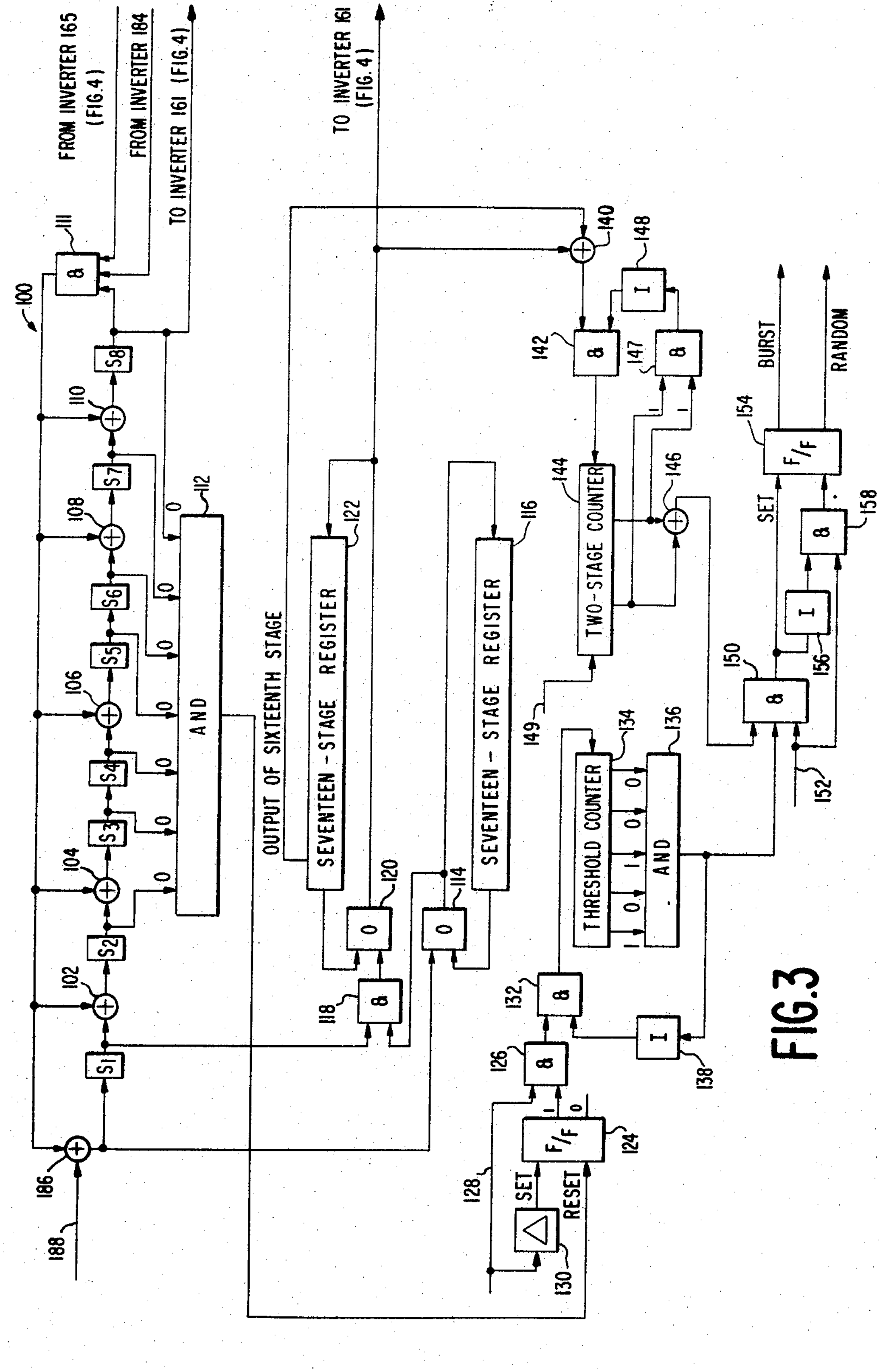
FIG. 3 shows the adaptive decision circuitry of the invention.

FIG. 3 shows the circuitry that is used to make the adaptive decision. To examine eight bits of the check word, a feedback shift register 100 is provided. The shift register has eight stages designated $S_1$ through $S_8$ and shifting is accomplished from the lower numbered stages to the higher numbered stages, i.e., from left to right. Exclusive-OR circuits 102, 104, 106, 108 and 110 have been inserted between certain stages of the shift register in order that appropriate feedback from the highest order stage $S_8$ of the shift register may be applied. The location of the Exclusive-OR circuits and the appropriate feedback is determined by the above-described manner of designing a decoder which uses the polynomial $P_1(X)=X^8+X^7+X^6+X^4+X^2+X+1$. Although that procedure for designing a decoder would indicate that an Exclusive-OR circuit should be placed between stages $S_3$ and $S_4$ and between stages $S_5$ and $S_6$, those Exclusive-OR circuits are not needed here because each of them would receive its second input from feedback supplied by an input message bit. Since the shift register 100 shown in FIG. 3 receives no input message bits, those Exclusive-OR circuits have been eliminated. AND circuit 111 is used to turn off feedback when errors are being corrected. In order to find out if the seven higher order stages of shift register 100 all contain zeros after any shift of the register, AND circuit 112 is provided. The output of the highest order stage $S_8$ of register 100 is connected to one input of OR circuit 114 the output of which is connected to the lowest order stage of seventeen-stage shift register 116 which is used to note if a one ever occurs in the last stage of register 100. The output of the highest order stage of register 116 is connected to the other input of OR circuit 114. The output of OR circuit 114 is also connected to one input of AND circuit 118 the output of which is connected to one input of OR circuit 120 the output of which is connected to the input of seventeen-stage shift register 122. The second input of AND circuit 118 is connected to the output of the lowest order stage $S_1$ of register 100 to enable register 122 to note if a one occurs in the first stage of register 100 only when the corresponding stage of register 116 has noted the occurrence of a one. Registers 116 and 122 contain no feedback and are shifted from right to left.

In order to note the occurrence of all zeros in stages $S_2$ through $S_8$, the output of AND circuit 112 is connected to the Reset line of flip-flop 124, the "one" (up) output of which is connected to one input of AND circuit 126. The other input of AND circuit 126 is connected to sampling line 128 which is also connected to the input of a delay 130 the output of which is connected to the Set line of flip-flop 124. In order to keep track of the number of subblocks containing more than one error, the output of AND circuit 126 is connected to one input of AND circuit 132 the output of which is connected to the input of a five-position threshold counter 134. In order to detect that a sufficient number of subblocks have more than one error, the outputs of threshold counter 134 are connected to the inputs of AND circuit 136 the output of which is connected to Inverter circuit 138 the output of which is connected to the second input of AND circuit 132 thereby disabling AND circuit 132 when the threshold (20 in this case) is reached so that no further counting will take place.

In order to insure that Condition 3 above (i.e., there are not two or more disjoint bursts) is satisfied, the output of OR circuit 120 is also connected to one input of Exclusive-OR circuit 140 the other input of which is connected to the output of the sixteenth stage (counting from right to left) of register 122. The output of Exclusive-OR circuit 140 is connected to one input of AND circuit 142 the output of which is connected to the input of two-stage counter 144. To detect a count of "one" or "two" in the counter 144, the outputs of counter 144 are connected to the inputs of Exclusive-OR circuit 146. The outputs of counter 144 are also connected to the inputs of AND circuit 147 the output of which is connected to the input of Inverter circuit 148 the output of which is connected to the second input of AND circuit 142 in order to prevent further counting by counter 144 if a count of "three" is reached. Counter 144 is reset to zero by a pulse on line 149. AND circuit 150 receives its inputs from the output of Exclusive-OR circuit 146, the output of AND circuit 136 and from sampling line 152. The output of AND circuit 150 is connected to the Set line of flip-flop 154. The output of AND circuit 150 is also connected to the input of Inverter circuit 156 the output of which is connected to one input of AND circuit 158. Sampling line 152 feeds the other input of AND circuit 158 the output of which is connected to the Reset line of flip-flop 154.

OPERATION OF THE ADAPTIVE DECISION CIRCUITRY

For convenience, the eight bits of the check word that appear in each row of the matrix of FIG. 2 will be referred to as a "sub-syndrome." Each sub-syndrome will be analyzed separately by the circuitry shown in FIG. 3. First, the first sub-syndrome will be extracted from the memory 8 (FIG. 1) and placed in the register 100 (FIG. 3). The sub-syndrome will be shifted through the register 100 with feedback a number of times equal to the period of the interleaved polynomial. In this example, there will be seventeen shifts of each sub-syndrome through the register 100. Each of the registers 116 and 122 also has a number of stages equal to the period of the interleaved polynomial. The three conditions which contribute to the decision as to whether burst error correction or random error correction is appropriate are determined separately.

FIRST CONDITION

First, the registers 116 and 122 are used to determine if the last 200 bits of the total decoding syndrome or check word (equivalently the last bit of the sub-syndrome for each subblock) will be zero simultaneously at some shift through the message block. Each time that a one occurs in the highest order stage $S_8$ of register 100, a one will be entered into the lowest order stage of register 116 on the next shift. Each time that a one occurs in the lowest order stage $S_1$ of register 100 *and* a one is about to be shifted into the lowest order stage of register 116, a one will be entered into the lowest order stage of register 122. A one may be shifted into the lowest order stage of register 116 through OR circuit 114 either because a one has previously appeared in stage $S_8$ of register 100 or because there is a one in the highest order stage of register 116. After a sub-syndrome has been shifted seventeen times in register 100, register 100 will be cleared and the next sub-syndrome will be placed into it. Registers 116 and 122 are cleared (set to all zeros) only before the first sub-syndrome is entered into register 100. Registers 116 and 122 are not cleared again until the next complete syndrome is to be inspected. After all of the sub-syndromes have been shifted through register 100, register 122 will contain a zero in some stage if, and only if, the last 200 bits of the total syndrome are all zero for some number of shifts through the message block. Then, if these 200 zeros are indicative of the burst-error condition, the error pattern will be obtained by shifting (with feedback) the sub-syndrome for each subblock a number of times corresponding to the stage of register 122 which contains the zero.

SECOND CONDITION

The second condition contributing to the adaptive decision is a count of the number of subblocks in which the sub-syndrome indicates more than a single error. For each sub-syndrome that indicates no more than a single error, all of the stages $S_2$ through $S_8$ of register 100 will contain zeros after some number of shifts. Whenever that condition occurs, the output of AND circuit 112 will reset flip-flop 124. After a sub-syndrome has been shifted through register 100 seventeen times, a sampling pulse will be applied to one input of AND circuit 126 on line 128. If flip-flop 124 has not been reset and if threshold counter 134 has not yet reached a count of 20, the sampling pulse appearing on line 128 will pass through AND circuits 126 and 132 to increment the count in counter 134. The pulse appearing on line 128, after a suitable delay by delay circuit 130, will insure the flip-flop 124 is again set to its "one" state when the next sub-syndrome is entered into register 100. When threshold counter 134 reaches its predetermined count of 20, the output of AND circuit 136, after being inverted by Inverter circuit 138, will inhibit any further change of the count in counter 134.

THIRD CONDITION

The third condition contributing to the adaptive decision is that the previous two criteria are not satisfied for two or more disjoint bursts. This decision, which will be satisfied if a single set of isolated zeros is found in register 122 at the completion of all sub-syndrome calculations, is made during the time that the last sub-syndrome is being shifted through register 100. The Exclusive-OR circuit 140 compares the contents of the sixteenth and seventeenth stages of regiser 122 and produces an output when those stages differ. The output of Exclusive-OR circuit 140 is used to increment the count in counter 144. If counter 144 reaches a count of "three" (indicating that Condition three is not satisfied), then the output of AND circuit 147, after being inverted by Inverter circuit 148, will disable AND circuit 142 to prevent any further change in the count within counter 144. If there is a single set of isolated zeros in register 122 at the completion of calculations for the last sub-syndrome, then counter 144 will contain a count of "one" or "two" which will be indicated by the output of Exclusive-OR circuit 146.

If, at the completion of all sub-syndrome calculations, a single set of isolated zeros is found in register 122 and if the threshold has been reached, the adaptive decision flip-flop 154 is set to "one" to indicate burst error correction. Otherwise, flip-flop 154 is reset to "zero" to indicate random error correction.

CORRECTION CIRCUITRY

Figure 4:
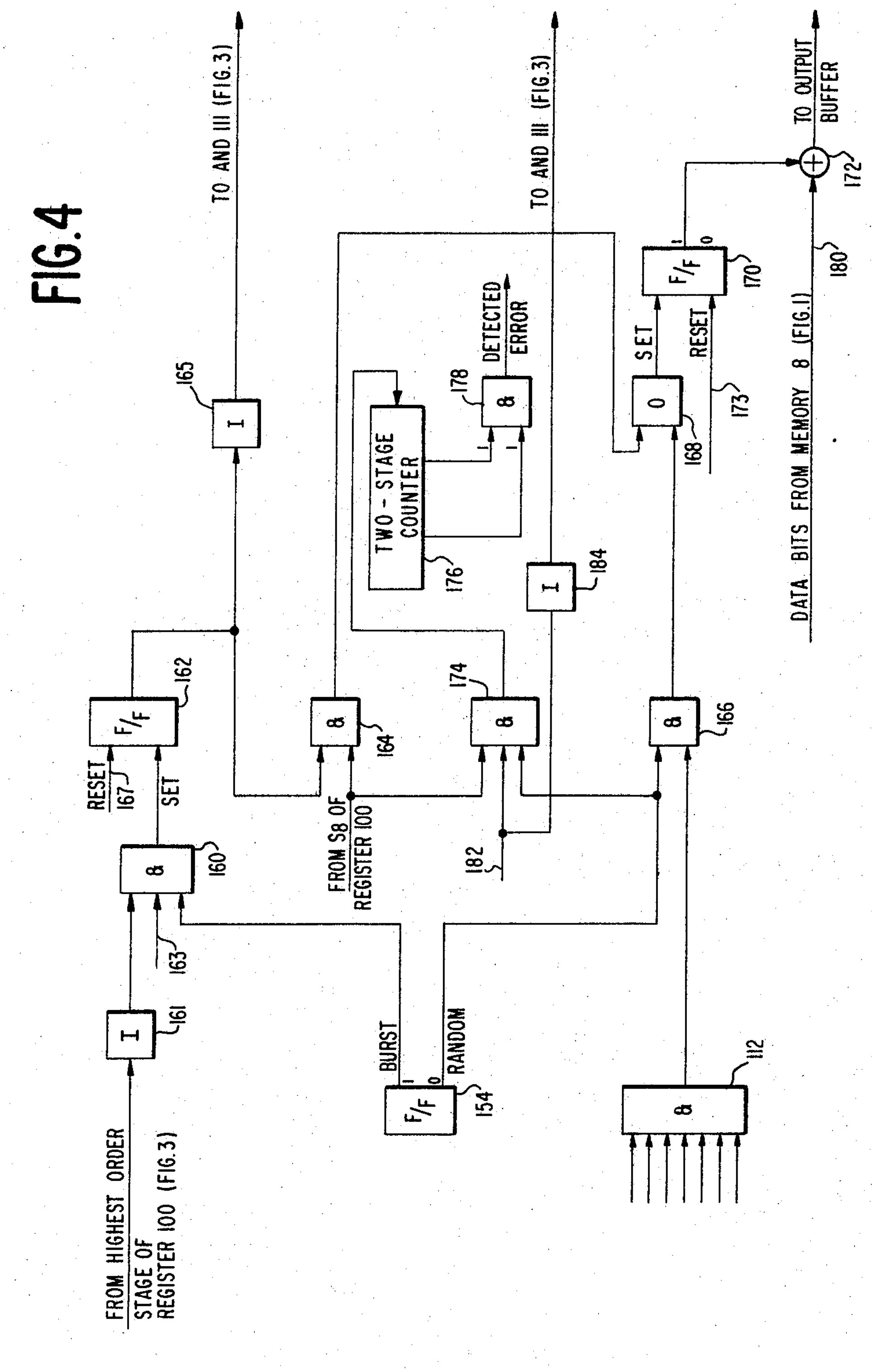
FIG. 4 shows the error correction circuitry of the invention.

The correction circuitry is shown in FIG. 4. When the system is in the burst error correcting mode, AND circuit 160 is fed by the "one" output of adaptive decision flip-flop 154, by correction timing line 163 and by the output of Inverter circuit 161 which receives its input from the highest order stage of register 122 (FIG. 3). The output of AND circuit 160 feeds the Set input of flip-flop 162 the output of which is connected to one input of AND circuit 164 and to Inverter circuit 165. Line 167 feeds the Reset input of flip-flop 162. In the random error correcting mode, the output of AND circuit 112 (which receives its input from stages $S_2$ through $S_8$ of register 100) feeds one input of AND circuit 166. The other input to AND circuit 166 comes from the "zero" output of adaptive decision flip-flop 154. The output of AND circuit 166 is connected to one input of OR circuit 168 the other input of which is connected to the output of AND circuit 164. The output of OR circuit 168 is connected to the Set input of flip-flop 170 the "one" output of which is connected to one input of Exclusive-OR circuit 172. Flip-flop 170 will be reset after each bit by a pulse on line 173. The output of $S_8$ of register 100 and the "zero" output of adaptive decision flip-flop 154 each feeds one input of AND circuit 174 the output of which is connected to two-stage counter 176. In order to indicate the presence of an uncorrectable error, the outputs of counter 176 are fed to the two inputs of AND circuit 178. Data will be received from the memory 8 on line 180.

OPERATION OF THE CORRECTION CIRCUITRY

Burst error correction

When the circuitry shown in FIG. 4 is set for burst error correction, flip-flop 154 will be in its "one" condition and there will be a signal present on line 163. The first sub-syndrome will be placed in register 100 (FIG. 3). Registers 100 and 122 will then be simultaneously shifted eight times. Register 100 will be shifted with feedback eight shifts or until a zero enters the seventeenth stage of register 122. A zero in the seventeenth stage of register 122 will cause flip-flop 162 of FIG. 4 to be set to its "one" state. The output of flip-flop 162, after being inverted by Inverter circuit 165 will then disable AND circuit 111 of FIG. 3 preventing further feedback within register 100. The remainder of the eight shifts will then be performed. These initial eight shifts are necessary in order to take care of the possibility that a "wrap-around burst" starting in the redundancy and ending in the data occurred. Once flip-flop 162 has been set to its "one" state (indicating that the burst has been located and the error pattern is now contained in register 100), then each time that a one appears in the highest order stage $S_8$ of register 100 a signal will pass through AND circuit 164 and through OR circuit 168 to set flip-flop 170 to its "one" state. Flip-flop 170 will be reset to its "zero" state just before each successive shift. After the initial eight shifts, registers 100 and 122 will be shifted once more and the first bit of data received from the memory 8 (FIG. 1) will then be on line 180. If this first information bit had been erroneously received, flip-flop 170 will be in its "one" state and Exclusive-OR circuit 172 will cause the bit to be complemented before it is sent to the output buffer. If the first bit had been correctly received, then flip-flop 170 will be in its "zero" state and the bit will pass to the output buffer unchanged. After the first data bit has gone to the output buffer, flip-flop 162 will be reset to its "zero" state by a pulse appearing on line 167, register 100 will be shifted once to prepare the sub-syndrome for correction of the second data bit of the subblock, the contents of register 100 will be placed back in the memory 8 replacing the first sub-syndrome that had been contained therein, and register 122 will be shifted eight more times to return it to its original state. The above will then be repeated for each sub-syndrome and subblock until the first data bit of each subblock has been corrected and set to the output buffer. After the first data bit of the last subblock has been sent to the output buffer, the contents of register 100 will be shifted and placed in the memory, but flip-flop 162 will not be reset. Register 122 will not be shifted the eight additional times but will be shifted only once to set it in its proper state to begin correction of the second data bit of each subblock. The first sub-syndrome (which has been changed by the above-described shifts) will then be placed back into register 100. The second data bit of the first subblock will then be received on line 180 and corrected if necessary. The new contents of register 100 will be placed in memory 8 in place of the previous first sub-syndrome and the second sub-syndrome will be placed in register 100. The second data bit of the second subblock will then be received on line 180 and corrected if necessary. This will be repeated for such sub-syndrome and subblock until the second data bit of each subblock has been sent to the output buffer. After the second data bit of the last subblock has been corrected, register 122 will be shifted one additional time. It will then be possible to correct the third data bit of each subblock. The above procedure will be repeated until each data bit of each subblock has been corrected and sent to the output buffer.

Random error correction

If the adaptive decision circuitry of FIG. 3 has determined that random error correction is appropriate, corrections will be made on a subblock-by-subblock basis. Each sub-syndrome must be examined for each data bit in the subblock to see if the sub-syndrome contains any of the error patterns corresponding to an error in that bit position and at most one of the other bit positions. The sub-syndrome is first loaded from the memory into register 100. Register 100 will then be shifted once, with feedback, to place the sub-syndrome in position to be examined for an indication of an error in the first data bit of the subblock. This is done only for the first data bit of the subblock. Register 100 will be shifted again at the same time that a pulse is caused to apear on line 188 which feeds one input of Exclusive-OR circuit 186, causing the bit entering stage $S_1$ of register 100 to be complemented. This is equivalent to subtracting from the sub-syndrome a bit corresponding to an error in the first bit of the subblock. Flip-flop 170 will be reset at this time. Register 100 will then be shifted sixteen additional times. If a correctable error occurred and the first data bit of the subblock was erroneous, then stages $S_2$ through $S_8$ of register 100 will all contain zeros after one of the sixteen shifts. This will result in the output of AND circuit 112 setting the correction flip-flop 170 to its "one" state. After the above shifts, the first data bit of the subblock will be received on line 180. If flip-flop 170 has been set to its "one" state, the bit will be complemented to correct it. If flip-flop 170 has not been set, the bit will pass to the output buffer unchanged. After the first data bit of the subblock has passed to the output buffer, register 100 will be shifted to put it in condition to examine the sub-syndrome for an indication of an error in the second data bit of the subblock. During this shift, a pulse will be caused to appear on line 188 if the first data bit had been found not to be in error in order to put the sub-syndrome back into its initial condition. If the first data bit had been found to be erroneous, no pulse will appear on line 188. The above procedure will then be repeated (shifting while substracting an error indication, then sixteen additional shifts to determine the error condition, and one more shift to re-establish the syndrome) for each of the remaining data bits of the subblock. After the last data bit of the subblock has been sent to the output buffer and the effect on the sub-syndrome of an error indication for the eighth data bit has been re-inserted (if the eighth data bit was not erroneous), the sub-syndrome will be used to find if a detectable but uncorrectable error had occured. Register 100 will first be shifted, with feedback, nine times. The sub-syndrome will then contain three or more ones if, and only if, a detectable but uncorrectable error pattern had occurred. In order to let counter 176 count the number of ones in register 100, a pulse will be sent on line 182 to one input of AND circuit 174. The pulse on line 182 will be inverted by inverter circuit 184 to prevent feedback within register 100. Counter 176 will count the number of ones within register 100 as register 100 is shifted eight more times. A count within counter 176 of more than "two" will be sensed by AND circuit 178 to designate an uncorrectable error. (One or two "ones" in register 100 may be indicative of a correctable error pattern in the transmitted redundancy bits.)

It will be clear to those skilled in the art that various changes may be made in the above-described preferred embodiment of this invention. For example, registers identical to registers 100 and 122 of FIG. 3 could be easily incorporated into the correction circuitry of FIG. 4 so that, while corrections are being made for one block of data, the calculations necessary for the adaptive decision could be carried on for another block of data.

Another modification would involve shuttling information back and forth between the memory and the various registers of the system. This idea would permit the design of a "time-sharing" system wherein several messages may be worked upon at once. A single register of length $r_1$ [where $r_1$ is the degree of the small polynomial $P_1(X)$ which is used to construct the large coding polynomial $P(X)$] could then be used for both the encoding and the decoding process while, at the same time, error correction of one message and the adaptive decision for another message are being performed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A transmission error detection and correction system comprising:

decoding means for generating a check signal pattern from a received message, said received message comprising data and redundancy;

memory means connected to said decoding means for receiving and storing said check signal pattern and said data from said decoding means;

adaptive decision means connected to said decoding means for receiving said check signal pattern from said decoding means and generating a correctable burst error indication when the existence of a correctable burst of errors is determined to exist within said received message from said check signal pattern;

error correcting means connected to said adaptive decision means and to said memory means for receiving said data from said memory means and for receiving said correctable burst error indication from said adaptive decision means, said error correction means correcting errors in said data as burst error if the presence of the correctable burst error indication is received from said adaptive decision means and as random errors at all other times;

said system correcting either burst errors or random errors in said data.

2. The transmission error detection and correction system of claim 1 further including:

means for indicating the existence of an uncorrectable error within said received message.

3. The transmission error detection and correction system of claim 1 wherein said adaptive decision means comprises:

a feedback shift register having $r_1$ stages receiving a portion of said check signal from said decoding means; and detecting means connected to said feedback shift register detecting the occurrence of a given number of consecutive zeros in the lowest order positions of said check word.

4. The transmission error detection and correction system of claim 3 wherein said adaptive decision means further comprises:

sensing means connected to said feedback shift register sensing the occurrence or $r_1-1$ zero in the stages of said feedback shift register; and counting means connected to said last-mentioned means counting the number of portions of said check signal for which said feedback shift register contains more than $r_1-1$ zeros.

5. The transmission error detection and correction system of claim 4 wherein said adaptive decision means further comprises:

bistable indicating means connected to said detecting means and to said counting means;

a first stable state of said bistable indicating means being indicative of a correctable burst of errors in said received message and the second stable state of said bistable indicating means being indicative of the absence of a correctable burst of errors in said received message.

6. The transmission error detection system of claim 5 wherein:

said error correcting means is connected to the output of said bistable indicating means.

7. The transmission error detection and correction system of claim 6 wherein said error correcting means comprises:

first means connected to said bistable indicating means and to said feedback shift register;

said first means producing an output signal corresponding to each error in said data when said bistable indicating means is in its first stable state;

second means connected to said bistable indicating means and to said sensing means;

said second means producing an output signal corresponding to each correctable error in said data when said bistable indicating means is in its second stable state.

8. The transmission error detection and correction system of claim 7 wherein said error correcting means further comprises:

complementing means connected to said first means, to said second means and to said memory means;

said complementing means correcting an error in said data each time that an output signal is produced by said first means or by said second means.

9. The transmission error detection and correction system of claim 8 wherein said error correcting means further comprises:

error detecting means connected to said bistable indicating means and to said feedback shift register;

said error detecting means producing a signal at its output if said received message contains an uncorrectable error.

10. The transmission error detection and correction system of claim 9 wherein said error detecting means comprises:

a counter counting the number of times that a one signal appears in the highest order stage of said feedback shift register.

References Cited

UNITED STATES PATENTS

| | | | |
|---|---|---|---|
| 3,278,729 | 10/1966 | Chien | 235—153 |
| 3,291,972 | 12/1966 | Helm | 235—153 X |
| 3,336,467 | 8/1967 | Frey | 235—153 |
| 3,340,507 | 9/1967 | Hotz | 340—146.1 |
| 3,373,404 | 3/1968 | Webb | 340—146.1 |
| 3,402,390 | 9/1968 | Tsimbidis et al. | 340—146.1 |
| 3,411,135 | 11/1968 | Watts | 340—146.1 |

MALCOLM A. MORRISON, Primary Examiner

C. E. ATKINSON, Assistant Examiner

U.S. Cl. X.R.

325—41